United States Patent [19]

Hinz et al.

[11] 4,137,536

[45] Jan. 30, 1979

[54] ELECTROSTATIC PRINTING DEVICE WITH AIR CUSHION GUIDING

[75] Inventors: Hans-Dieter Hinz, Tornesch; Ulf Rothgordt, Norderstedt, both of Fed. Rep. of Germany

[73] Assignee: U.S. Philips Corporation, New York, N.Y.

[21] Appl. No.: 808,802

[22] Filed: Jun. 22, 1977

[30] Foreign Application Priority Data

Jul. 31, 1976 [DE] Fed. Rep. of Germany ....... 2634561

[51] Int. Cl.$^2$ ...................... G03G 15/00; G01D 15/28

[52] U.S. Cl. ...................................... 346/155; 346/153

[58] Field of Search ............... 346/153, 155, 154, 162, 346/163, 165; 360/102

[56] References Cited

U.S. PATENT DOCUMENTS

| | | | |
|---|---|---|---|
| 2,127,331 | 8/1938 | Fulton | 346/165 |
| 2,575,742 | 11/1951 | Baltin | 346/165 |
| 2,881,044 | 4/1959 | Eisler | 346/165 |
| 3,998,315 | 12/1976 | Phillips | 346/163 |
| 4,028,711 | 6/1977 | Jost | 346/153 |

*Primary Examiner*—Jay P. Lucas

*Attorney, Agent, or Firm*—David R. Treacy; Robert S. Smith

[57] ABSTRACT

An electrostatic printing device comprising a rotatable printing roller with stylus electrodes. In order to keep the distance of the images or of the recorded sheets small and the images themselves clear and pure, notably at the edges, the stylus electrodes are moved transversely of the longitudinal direction of the tape-like record carrier. The foil tape is at the same time continuously transported. Thus, the translatory movement of the printing roller supporting the stylus electrodes is eliminated.

6 Claims, 3 Drawing Figures

ELECTROSTATIC PRINTING DEVICE WITH AIR CUSHION GUIDING

The invention relates to a device for the electrostatic printing of alphanumerical characters or facsimile images, comprising a rotatable printing roller in which one or more stylus electrodes are arranged at mutually equal angular distances, and also comprising a tape-like record carrier which is separated from the printing roller by an air cushion, it being possible, during the relative movement between printing roller and record carrier, to apply controllable electric pulses to the stylus electrodes, coming into contact with the record carrier under pressure, so that the images are point-wise recorded.

A device of this kind is known from German Offenlegungsschrift No. 24 18 632. The printing method used therein enables high-resolution image-wise electrostatic charging of dielectric record carriers, by means of stylus electrodes which contact the record carrier under pressure, in the voltage range of approximately 350 V. Each point of the image plane must then be brought into contact with the stylus electrodes at a uniform pressure. The printing roller which rotates during the recording forms an essential part of these known devices. This roller accommodates at least one stylus electrode which receives electric signals for recording. When several stylus electrodes are used, they are arranged on the printing roller at mutually equal angular distances. For the record carrier, use is made of a polyester foil which is metallized on one side and which is guided around the printing roller over an angle which corresponds to the image length, including the spacing, and which is limited by guide rollers. The record carrier is stationary during the recording, while the printing roller rotates. Between the surface of the record carrier and the jacket of the rotating printing roller an air cushion is present. The aerodynamically maintained over pressure of this air cushion keeps the record carrier, tensioned by tensile forces, at the correct distance. The stylus electrodes are adjusted so that the tips thereof project from the jacket of the roller. They thus deflect the foil in a defined manner. In doing so, they are not obstructed by a backing. The reactive force of the deflected record carrier ensures the intimate contact between the record carrier and the recording tips of the stylus electrodes which is required for uniform charging.

As a result of the rotation of the roller, the stylus electrodes realize line-wise recording on the record carrier in the longitudinal direction thereof. The line spacing of the image is obtained by a corresponding translation of the printing roller transversely of the longitudinal direction of the record carrier. In the case of alphanumerical print, each recording line consists of charged and non-charged regions as a result of pulse-wise digital actuation. The characters are thus printed in matrix print. In the case of facsimile recording, an image-wise different charge track is obtained by analog actuation. The latent charge images are made visible in a high-resolution, liquid development process and are subsequently fixed.

Due to the readily achievable high resolution of, for example, 100 lines/mm and the simple control of the magnitude of the charge, being proportional to the applied voltage, the method and the device are particularly suitable for COM (computer output on microfilm) output of alphanumerical texts, or the correct reproduction of semi-tone images of high resolution and optical density. The direct, digital electronic actuation is important in this respect.

This known device which records in the longitudinal direction (i.e. the line-wise recording takes place in the longitudinal direction of the record carrier) has a number of practical drawbacks. The distance between the printing roller and the record carrier is constant in the actual recording region, but is larger in the run-in and run-out regions of the record carrier in the vicinity of the guide rollers. Therefore, correct recording on the record carrier is not possible in these regions. Consequently, the images cannot be printed one directly adjacent the other. Moreover, this distance region does not have a uniform, pure image background as a result of the slow (tangential) approach of the record carrier by the electrode styli. Thus, the known device cannot very well be used for the normal microfilm technique. The distance between images is too large (approximately 10 mm) and not exact.

Furthermore, as a result of the line-wise longitudinal recording on a stationary record carrier, the printing roller must perform, by way of a separately driven slide, a translatory movement in the width direction of the image, including the run-in and the run-out. Recording is effected in only one movement direction, so that the printing roller and the slide must be returned to the starting position prior to each recording of an image. At the same time, the record carrier is transported in the longitudinal direction of the image, including the said interval of approximately 10 mm. For this purpose, the record carrier must be separated from the printing roller by a special mechanism in order to ensure that the recorded part of the record carrier contacts neither the printing roller nor the stylus electrodes. Otherwise, the already printed image would be disturbed. This discontinuous method reduces the recording performance and results in a mechanically and electronically complex device. The construction dimensions desired for an average data processing apparatus cannot be realized and the requirements as regards development of noise and operating reliability cannot be satisfied.

The invention has for its object to provide a device of the kind set forth which enables a continuous method with optimum recording performance, the construction being simple and compact, and printing of images with an arbitrary width and intervals.

To this end, the device in accordance with the invention is characterized in that during the printing, the printing roller performs a rotary movement transversely of the longitudinal direction of the record carrier which is continuously advanced in the printing region in its longitudinal direction and which is bent by a guide element, arranged in front of and behind the printing region in the movement direction of the record carrier and leaving this region at least partly free, in order to form a cylinder surface which is coaxial to the axis of the printing roller, so that a strip along each of the two edges of the record carrier extends tangentially relative to the surface of the printing roller. Preferably, the guide element is arranged concentric to the axis of rotation of the printing roller, and comprises a central aperture which is situated symmetrically relative to the recording track of the stylus electrodes.

Through the aperture of the guide element, each stylus electrode can perform the deflection of the record carrier, required for the contact-wise recording, without obstruction and without the tangential alignment of the sides of the record carrier in the recording region itself having to be given up. The correct bending of the record carrier during the rotation of the printing roller is achieved in that an overpressure air cushion is aerodynamically built up between the roller jacket and the record carrier. This air cushion at the same time damps any vibrations of the record carrier caused by the contacting stylus electrodes.

The invention will be described in detail hereinafter with reference to an embodiment of a COM text printer as shown in the Figures.

Figure 1:
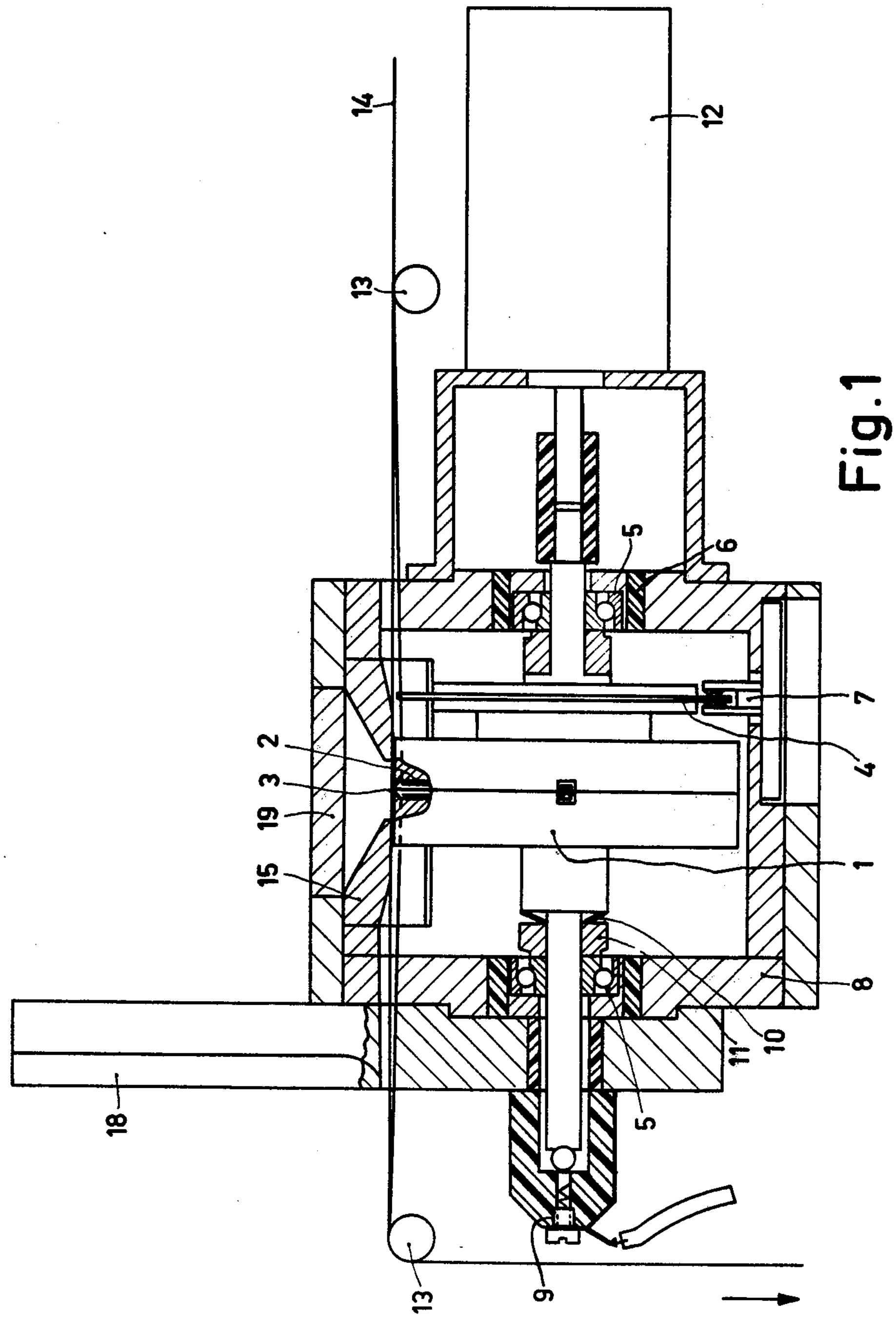
FIG. 1 is a longitudinal sectional view of the electrostatic printing device in accordance with the invention.

All parts of the printer which are not directly necessary for a proper understanding of the invention have been omitted in the drawings. Notably, the auxiliary devices for the electrostatic printer, such as the device for transporting the record carrier and the developing as well as the fixing device for making visible and fixing the latent electrostatic charge images, have been omitted. They can be manufactured in a known, conventional manner.

The device shown in FIG. 1 consists mainly of rotation-symmetrical parts which are assembled to be concentric to the central axis. All rotating and all voltage-carrying parts are completely accommodated in the housing 8. Thus, danger to operators as well as the risk of damage of sensitive parts of the device is precluded.

Figure 2:
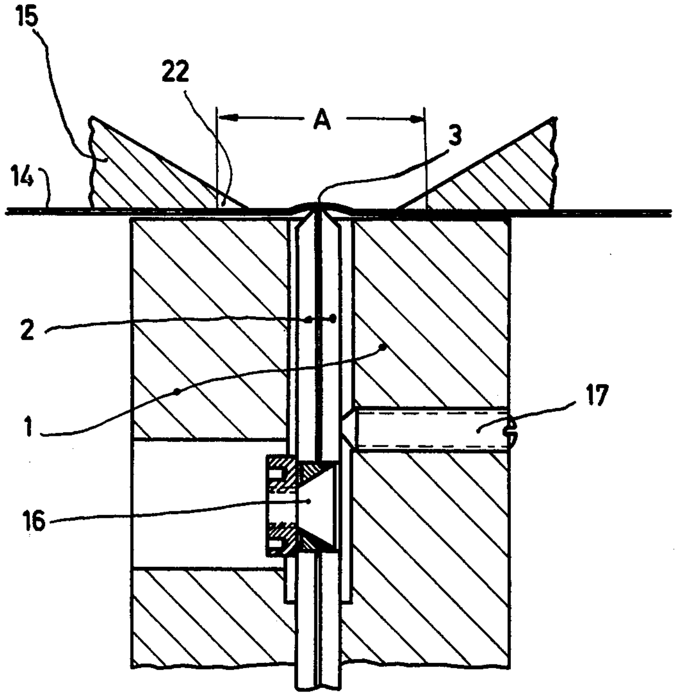
FIG. 2 is a longitudinal sectional view at an increased scale of the printing region of the device shown in FIG. 1.
Figure 3:
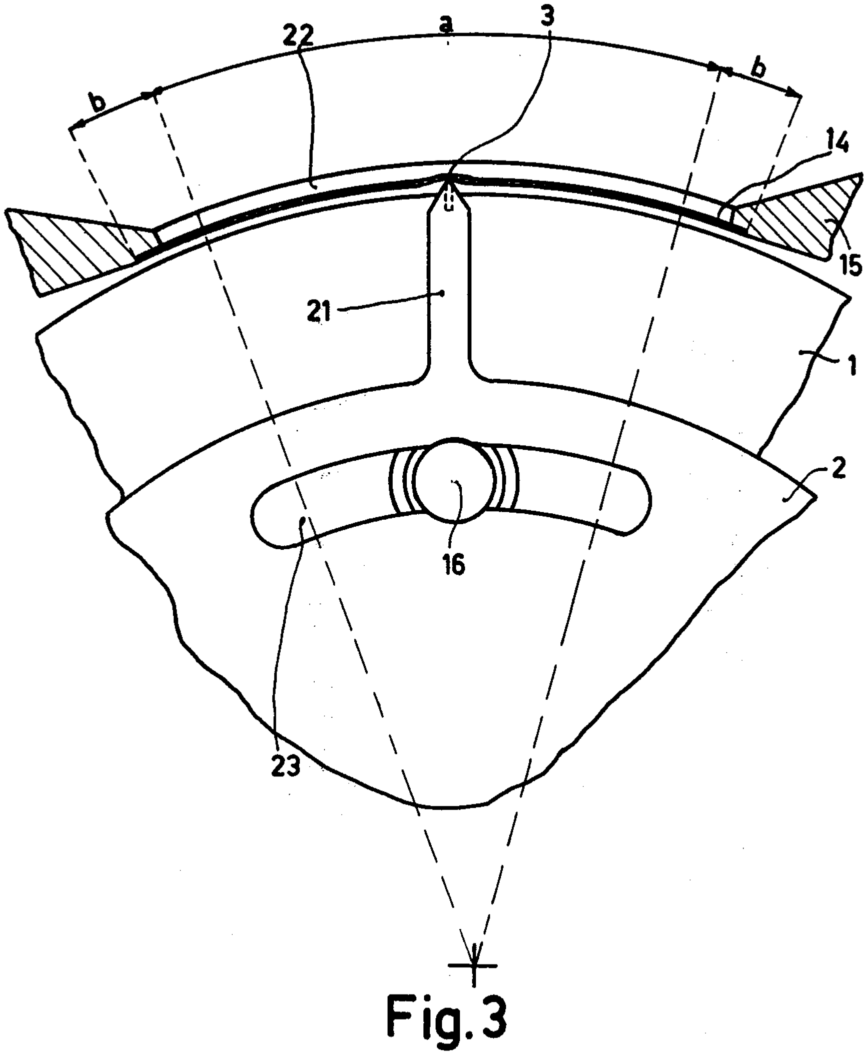
FIG. 3 is a cross-sectional view of the printing region shown in FIG. 2.

An essential part of the device is formed by the printing roller 1 which rotates during the recording. This printing roller 1 comprises a double disc 2, the diameter of which is smaller than the roller diameter and which comprises a number of double arms 21 which each includes a stylus electrodes 3 (see also FIG. 3). A stylus electrode 3 is clamped between each pair of contacting arms which together form a double arm 21. In the example, four stylus electrodes 3 are provided at angular distance of 90° on the circumference of the disc. For the stylus electrodes use is made of exceptionally wear resistant SiC whiskers (diameter 20 μm) which are enveloped by a nickel jacket having a thickness of 15 μm in order to ensure suitable mechanical and electrical connection. The projection level thereof, i.e. the level of their tip above the roller jacket, and hence the deflection of the record carrier, can be separately adjusted for each stylus electrode 3 by means of a clamping cone 16 (see also FIG. 2). The construction may be adapted to the specific circumstances. In this embodiment, the entire arm 21 with a part of the disc 2 can be slightly shifted by means of the clamping cone 16. To this end, the clamping cone 16 is arranged in an elongate slot 23 which is recessed in the disc 2 at the area of the arm 21 and which extends transversely of the longitudinal direction of the arm. Adjustment of the stylus electrode 3 in a direction perpendicularly to the plane of the rotation of roller is performed by means of an adjusting screw 17 which laterally acts on the arm 21. The adjustment can be observed and measured by means of a microscope (not shown) which can be arranged on a holder 18.

A slotted disc 4 is flanged to the printing roller 1 by a flange. This disc 4 co-operates with an optoelectric scanning device 7 for synchronization of the recording.

The printing roller 1 is carried for rotation by two ball bearings 5 which are electrically insulated from the housing 8 by insulators 6. The printing roller 1 is driven by a directly flanged-on electric motor 12. The controllable electric voltage for the recording is supplied via a wiper contact device 9. In this rotating assembly axial play is prevented by means of a spring disc 10 and a pressure piece 11.

The input and output of the record carrier 14, may be a polyester foil which is metallized on the rear and have a thickness of 20 μm and a width of 25.4 mm, is assisted or effected via rolls 13 which are secured to the printer disposed in spaced relationship to the rest of the device. Inside the device, the record carrier 14 is guided and shaped by a guide element 15. This element 15 is arranged in the housing 8 with a face which is concentric to the axis of the printing roller 1. In the printing region a and A (FIGS. 2 and 3), the record carrier 14 is thus shaped to form an arcuate surface concentric with the axis of rotation. Along each of the two edges of the record carrier there is a strip b which in this region tangentially extends relative to the surface of the printing roller 1. This construction prevents the rotating stylus electrodes 3, contacting the record carrier 14, from damaging the record carrier 14 or themselves when entering or leaving the recording track.

The described deformation of the record carrier 14 can be readily effected on the basis of the deformability of the part of the record carrier 14 which is slightly tensioned between the rolls 13 and which has in a preferred form a length of approximately 150 mm. The height of the device relative to the guide rolls 13 is adjusted so that the record carrier 14 bends to form the desired shape, i.e. the device is adjusted to be slightly higher than the guide rolls 13. Complete adaptation to the shape prescribed by the guide element 15, however, is realized by the overpressure which is aerodynamically maintained, by rotation of the printing roller 1, in a gap of approximately 50 μm between the roller jacket and the part of the record carrier 14 which is present in the guide element 15.

An aperture 22 which has a width of approximately 10 mm and which is symmetrical relative to the recording track is recessed in the guide element 15, so that the guide element substantially leaves the record carrier free in the printing region (A, a) and the stylus electrode 3 can slide at a predetermined pressure over the bent record carrier 14, without being obstructed by a fixed anvil. Because the guide element 15 is also present in the printing region above the side strips b of the record carrier 14, the tangential guiding of the record carrier 14 is also ensured in the printing region. When the record carrier 14 is approached, the stylus electrode 3 contacts approximately at the boundary of the strip b and the region a. The printing region is protected against accidental touching by the lid or cover 19.

For the described use as, for example, a COM text printer for normal data processing with an adequate recording performance of approximately 25 micro images (for example, DIN A4 sheets reduced by a ratio 1:24 and comprising approximately $10^6$ image points) per minute, the printing roller 1 rotates at a circumferential speed of 16 m/s at a roller diameter of 60 mm. The stylus electrodes 3 deflect the record carrier 14 in the recording track over a distance of 50 μm. The transport speed of the foil tape 14 amounts to 4 mm per second.

In comparison with the intermittently operating known COM printing device, recording in the longitudinal direction, the described transversely recording and continuously operating printing device in accordance with the invention comprises a substantially smaller number of function groups and also has a smaller structural shape, while offering a recording performance which is 2½ times higher.

What is claimed is:

1. A device for the electrostatic printing of alphanumerical characters or facsimile images on an associated elongated record carrier which comprises: a rotatable printing roller which includes one or more radially extending stylus electrodes disposed at equal angular increments about said roller, means for holding the record carrier in spaced relationship from said printing roller, an air cushion without physical support touching the record carrier disposed in the region of said record carrier which is touched by said stylus electrodes, means for moving said record carrier axially and continuously during printing, means for selectively applying controllable electric pulses to each stylus electrodes when there is contact with the record carrier, so that discrete point images are recorded, means for rotating said printing roller in a plane transverse to the axial direction of the record carrier, said means for holding said record carrier positioning including a guide element cooperating with the record carrier in front of and behind the region in which contact between each said stylus electrode and the record carrier occurs, said guide leaving this region at least partly unconstrained in order to form an arcuate surface which is coaxial to the axis of the printing roller.

2. A device as claimed in claim 1 characterized in that the guide comprises a central aperture which is symmetrically arranged relative to the recording track of each of said stylus electrodes.

3. A device as claimed in claim 1 wherein said printing roller further includes a first disc and a second disc, said first and second discs having a diameter smaller than the diameter of said printing roller, each disc including an elongated arm, each of said stylus electrodes being clamped between one of said elongated arms on said first disc and one of said arms of said second disc.

4. A device as claimed in claim 3 wherein said printing roller further includes an elongated arcuate slot disposed in one of said discs proximate each elongated arm, said slot extending transverse to the longitudinal direction of said arm which is proximate said printing roller further including a clamping cone cooperating with each elongated arcuate slot to provide radially adjustment in the longitudinal direction of each arm relative to the axis of rotation of said printing roller.

5. A device as claimed in claim 3 further including means for adjusting each arm in a direction perpendicular to the plane of rotation of said printing roller, said means including an adjusting screw which laterally acts on the arm which is adjusted.

6. A device as claimed in claim 1 further including a strip extending along each of the two edges of the record carrier which extend tangentially relative to the surface of said printing roller to provide clearance for each stylus electrode.

* * * * *